United States Patent
Miyata et al.

(10) Patent No.: US 7,559,996 B2
(45) Date of Patent: Jul. 14, 2009

(54) RARE EARTH PERMANENT MAGNET, MAKING METHOD, AND PERMANENT MAGNET ROTARY MACHINE

(75) Inventors: Koji Miyata, Echizen (JP); Koichi Hirota, Echizen (JP); Hajime Nakamura, Echizen (JP); Takehisa Minowa, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 241 days.

(21) Appl. No.: 11/489,595

(22) Filed: Jul. 20, 2006

(65) Prior Publication Data
US 2007/0017601 A1   Jan. 25, 2007

(30) Foreign Application Priority Data
Jul. 22, 2005   (JP)   ............... 2005-212265

(51) Int. Cl.
*H01F 1/057*   (2006.01)
*H01F 1/08*   (2006.01)
(52) U.S. Cl. ............ 148/302; 310/44; 310/156.01; 335/302
(58) Field of Classification Search ............ 148/302
See application file for complete search history.

(56) References Cited

U.S. PATENT DOCUMENTS

| | | | | |
|---|---|---|---|---|
| 5,013,411 | A * | 5/1991 | Minowa et al. | 205/119 |
| 6,606,019 | B1 * | 8/2003 | Ohashi | 335/302 |
| 2006/0213582 | A1 | 9/2006 | Nakamura et al. | |
| 2006/0213583 | A1 | 9/2006 | Nakamura et al. | |
| 2006/0213584 | A1 | 9/2006 | Nakamura et al. | |
| 2006/0213585 | A1 | 9/2006 | Nakamura et al. | |
| 2006/0292395 | A1 * | 12/2006 | Mori et al. | 428/692.1 |
| 2008/0245442 | A1 | 10/2008 | Nakamura et al. | |

FOREIGN PATENT DOCUMENTS

| | | |
|---|---|---|
| EP | 1 065 777 A1 | 1/2001 |
| JP | 5-21218 A | 1/1993 |
| JP | 5-31807 B2 | 2/1993 |
| JP | 2002-299110 A | 10/2002 |

(Continued)

OTHER PUBLICATIONS

Nakamura, H., et al., Magnetic Properties of Extremely Small Nd-Fe-B Sintered Magnets, IEEE Transactions on Magnetics, 41(10), 3844-3846, Oct. 2006.*

(Continued)

*Primary Examiner*—Melvin C Mayes
*Assistant Examiner*—James Corno
(74) *Attorney, Agent, or Firm*—Birch, Stewart, Kolasch & Birch, LLP

(57) ABSTRACT

A rare earth permanent magnet is prepared from a sintered magnet body of a $R^1$—Fe—B composition wherein $R^1$ is a rare earth element inclusive of Y and Sc, by forming a plurality of slits in a surface of the magnet body, disposing a powder on the magnet body surface, the powder comprising an oxide of $R^2$, a fluoride of $R^3$, or an oxyfluoride of $R^4$ wherein each of $R^2$, $R^3$, and $R^4$ is a rare earth element, and heat treating the magnet body and the powder below the sintering temperature in vacuum or in an inert gas.

17 Claims, 5 Drawing Sheets

FOREIGN PATENT DOCUMENTS

WO    WO-2006/043348    4/2006

OTHER PUBLICATIONS

Hwang et al., IEEE Transaction on Magnetics, vol. 40, No. 4, pp. 2877-2879 (Jul. 2004).

Buinovskii et. al., "Production of the Nd-Fe-B-based magnetic materials from flurides", The Institution of Electrical Engineers Stevenage, GB XP002408354 (1996).

Park et al., Proceedings of the Sixteenth International Workshop on Rare-Earth Magnets and Their Applications, 2000, pp. 257-263.

Durst et al., Journal of Magnetism and Magnetic Materials, 1987, pp. 63-75, 68.

Machida et al., Proceedings of the 2004 Spring Meeting of the Powder & Powder Metallurgy Society, pp. 202.

K. Machida et al., "Grain Boundary Tailoring of Nd-Fe-B Sintered Magnets and their Magnetic Properties," Proceedings of the 2004 Spring Meeting of the Powder & Powder Metallurgy Society, p. 202.

* cited by examiner

RARE EARTH PERMANENT MAGNET, MAKING METHOD, AND PERMANENT MAGNET ROTARY MACHINE

CROSS-REFERENCE TO RELATED APPLICATION

This non-provisional application claims priority under 35 U.S.C. §119(a) on Patent Application No. 2005-212265 filed in Japan on Jul. 22, 2005, the entire contents of which are hereby incorporated by reference.

TECHNICAL FIELD

This invention relates to a R—Fe—B system rare earth permanent magnet whose coercive force is enhanced while minimizing a decline of its remanence; a method for preparing the same; and a permanent magnet rotary machine best suited as electric vehicle motors, power generators and FA motors capable of high speed rotation.

BACKGROUND ART

Nd—Fe—B system permanent magnets have a growing range of application due to their excellent magnetic properties. Also in the field of rotary machines including motors and power generators, permanent magnet rotary machines utilizing Nd—Fe—B system permanent magnets were developed to meet the recent demand for size, profile and weight reductions, performance enhancement and energy saving. Permanent magnets are situated in rotary machines such that they are exposed to high temperature due to the heat generated by windings and cores and have a likelihood of demagnetization by the diamagnetic field from the windings. There thus exists a demand for Nd—Fe—B system sintered magnets in which the coercive force which is an index of heat resistance and demagnetization resistance is above a certain level and the remanence (or residual magnetic flux density) which is an index of the magnitude of magnetic force is as high as possible.

An increase in the remanence (or residual magnetic flux density) of Nd—Fe—B sintered magnets can be achieved by increasing the volume factor of $Nd_2Fe_{14}B$ compound and improving the crystal orientation. To this end, a number of modifications have been made on the process. With respect to the increased coercive force, among different approaches including grain refinement, the use of alloy compositions with greater Nd contents, and the addition of effective elements, the currently most common approach is to use alloy compositions having Dy or Tb substituent for part of Nd. Substituting these elements for Nd in the $Nd_2Fe_{14}B$ compound increases both the anisotropic magnetic field and the coercive force of the compound. The substitution with Dy or Tb, on the other hand, reduces the saturation magnetic polarization of the compound. Therefore, as long as the above approach is taken to increase coercive force, a loss of remanence is unavoidable.

In Nd—Fe—B sintered magnets, the coercive force is given by the magnitude of an external magnetic field created by nuclei of reverse magnetic domains at grain boundaries. Formation of nuclei of reverse magnetic domains is largely dictated by the structure of the grain boundary in such a manner that any disorder of grain structure in proximity to the boundary invites a disturbance of magnetic structure, helping formation of reverse magnetic domains. It is generally believed that a magnetic structure extending from the grain boundary to a depth of about 5 nm contributes to an increase of coercive force (See K. D. Durst and H. Kronmuller, "THE COERCIVE FIELD OF SINTERED AND MELT-SPUN NdFeB MAGNETS," Journal of Magnetism and Magnetic Materials, 68 (1987), 63-75). The inventors found that by concentrating trace Dy or Tb only in proximity to the grain boundaries to increase the anisotropic magnetic field only in proximity to the boundaries, the coercive force can be increased while suppressing any decline of remanence (as disclosed in JP-B 5-31807). Subsequently, the inventors established a production method comprising separately preparing a $Nd_2Fe_{14}B$ compound composition alloy and a Dy or Tb-rich alloy, mixing them and sintering the mixture (as disclosed in JP-A 5-21218). In this method, the Dy or Tb-rich alloy becomes a liquid phase during the sintering and is distributed so as to surround the $Nd_2Fe_{14}B$ compound. As a consequence, substitution of Dy or Tb for Nd occurs only in proximity to grain boundaries in the compound, so that the coercive force can be effectively increased while suppressing any decline of remanence.

However, since the two types of alloy fine powders in the mixed state are sintered at a temperature as high as 1,000 to 1,100° C., the above-described method has a likelihood that Dy or Tb diffuses not only to the boundaries, but also into the interior of $Nd_2Fe_{14}B$ grains. An observation of the structure of an actually produced magnet shows that Dy or Tb has diffused to a depth of about 1 to 2 μm from the boundary in a grain boundary surface layer, the diffused area reaching 60% or more when calculated as volume fraction. As the distance of diffusion into grains becomes longer, the concentration of Dy or Tb near the boundaries becomes lower. To positively suppress the excessive diffusion into grains, lowering the sintering temperature may be effective. However, this measure cannot be practically acceptable because it compromises densification by sintering. An alternative method of sintering at lower temperatures while applying stresses by means of a hot press or the like enables densification, but poses the problem of extremely reduced productivity.

On the other hand, it is reported that coercive force can be increased by machining a sintered magnet to a small size, applying Dy or Tb on the magnet surface by sputtering, and heat treating the magnet at a temperature lower than the sintering temperature, thereby causing Dy or Tb to diffuse only to grain boundaries (see K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000); and K. Machida, H. Kawasaki, M. Ito and T. Horikawa, "Grain Boundary Tailoring of Nd—Fe—B Sintered Magnets and Their Magnetic Properties," Proceedings of the 2004 Spring Meeting of the Powder & Powder Metallurgy Society, p. 202). This method allows for more effective concentration of Dy or Tb at the grain boundary and succeeds in increasing the coercive force without a substantial loss of remanence. As the magnet becomes larger in specific surface area, that is, the magnet body becomes smaller, the amount of Dy or Tb fed becomes larger, indicating that this method is applicable to only compact or thin magnets. However, there is still left the problem of poor productivity associated with the deposition of metal coating by sputtering or the like.

Nd—Fe—B system sintered magnets are now used in rotary machines with a high capacity of 10 kW or greater. Nd—Fe—B system sintered magnets are conductors having an electric resistance of 100 to 200 μΩ-cm. The eddy current generated within a magnet and heat generation associated therewith increase in proportion to the square of the magnet size. This gives rise to a problem in high capacity rotary machines. Effective means for reducing eddy currents is insulated lamination of thin plates like magnetic steel sheets in cores. The method including bonding finely divided magnet segments and consolidating into a magnet of the desired size has the problem that more steps are involved in the magnet manufacturing process, leading to an increase of manufacturing cost and a lowering of magnet weight-basis yield. Although one might consider to use magnet segments as such without bonding and consolidation, it is difficult to assemble and secure discrete magnet segments in a rotor against the repulsion between the magnet segments.

SUMMARY OF THE INVENTION

An object of the invention is to provide a R—Fe—B sintered magnet having minimized eddy current and a high coercive force suited for permanent magnet rotary machines wherein R is one or more elements selected from among rare earth elements inclusive of Y and Sc; a method for preparing the magnet; and a permanent magnet rotary machine using the magnet.

The inventors have found that when a $R^1$—Fe—B sintered magnet body, typically a Nd—Fe—B sintered magnet body is heated with a powder comprising at least one compound selected from among an oxide of $R^2$, a fluoride of $R^3$, or an oxyfluoride of $R^4$ wherein each of $R^2$, $R^3$, and $R^4$ is one or more elements selected from among rare earth elements inclusive of Y and Sc being present on the surface of the magnet body, the $R^2$, $R^3$ or $R^4$ contained in the powder is absorbed in the magnet body whereby coercive force is increased while significantly suppressing a decline of remanence. Particularly when a fluoride of $R^3$ or an oxyfluoride of $R^4$ is used, the $R^3$ or $R^4$ is efficiently absorbed in the magnet body along with fluorine, resulting in a sintered magnet having a high remanence and a high coercive force. When a plurality of slits are formed in the magnet body, the surface area of the magnet body is increased in a substantial sense and the percent absorption of $R^2$, $R^3$ or $R^4$ is enhanced. Additionally, the slits are effective for reducing eddy currents when the magnet is incorporated in a permanent magnet rotary machine. The present invention is predicated on this discovery.

The present invention thus provides a rare earth permanent magnet; a method for preparing the magnet; and a permanent magnet rotary machine using the magnet.

[1] A method for preparing a rare earth permanent magnet from a sintered magnet body of a $R^1$—Fe—B composition wherein $R^1$ is at least one element selected from among rare earth elements inclusive of Y and Sc, the method comprising the steps of:

forming a plurality of slits in at least one surface of the magnet body, disposing a powder on the magnet body surface, the powder comprising at least one compound selected from among an oxide of $R^2$, a fluoride of $R^3$, and an oxyfluoride of $R^4$ wherein each of $R^2$, $R^3$, and $R^4$ is at least one element selected from among rare earth elements inclusive of Y and Sc, and heat treating the magnet body and the powder at a temperature equal to or below the sintering temperature of the magnet body in vacuum or in an inert gas.

[2] A method for preparing a rare earth permanent magnet from a sintered magnet body of a $R^1$—Fe—B composition wherein $R^1$ is at least one element selected from among rare earth elements inclusive of Y and Sc, the method comprising the steps of:

disposing a powder on a surface of the magnet body, the powder comprising at least one compound selected from among an oxide of $R^2$, a fluoride of $R^3$, and an oxyfluoride of $R^4$ wherein each of $R^2$, $R^3$, and $R^4$ is at least one element selected from among rare earth elements inclusive of Y and Sc, heat treating the magnet body and the powder at a temperature equal to or below the sintering temperature of the magnet body in vacuum or in an inert gas, and forming a plurality of slits in at least one surface of the magnet body.

[3] The method of [1] or [2], wherein the plurality of slits formed in the surface of the magnet body are spaced at a spacing of up to 10 mm, and the distance between the bottom of each slit and the surface of the magnet body which is disposed remote from the slit surface is up to 5 mm.

[4] The method of [1], [2] or [3], wherein prior to the heat treatment, the sintered magnet body has a shape having a dimension of up to 100 mm at its maximum side and a dimension of up to 10 mm in a magnetic anisotropy direction.

[5] The method of any one of [1] to [4], wherein said powder is disposed on the magnet body surface in an amount corresponding to an average filling factor of at least 10% by volume in a magnet body-surrounding space within a distance of 1 mm from the magnet body surface.

[6] The method of any one of [1] to [5], wherein said powder has an average particle-size of up to 100 μm.

[7] The method of any one of [1] to [6], wherein each of $R^2$, $R^3$, and $R^4$ contains at least 10 atom % of Dy and/or Tb. [8] The method of any one of [1] to [7], wherein a powder comprising a fluoride of $R^3$ and/or an oxyfluoride of $R^4$ is used whereby fluorine is absorbed in the magnet body along with $R^3$ and/or $R^4$.

[9] The method of [8], wherein in the powder comprising a fluoride of $R^3$ and/or an oxyfluoride of $R^4$, $R^3$ and/or $R^4$ contains at least 10 atom % of Dy and/or Tb, and the total concentration of Nd and Pr in $R^3$ and/or $R^4$ is lower than the total concentration of Nd and Pr in $R^1$.

[10] The method of [8] or [9], wherein in the powder comprising a fluoride of $R^3$ and/or an oxyfluoride of $R^4$, the $R^3$ fluoride and the $R^4$ oxyfluoride are contained in a total amount of at least 10% by weight, with the balance being at least one compound selected from among a carbide, nitride, oxide, hydroxide and hydride of $R^5$ wherein $R^5$ is at least one element selected from among rare earth elements inclusive of Y and Sc.

[11] The method of any one of [1] to [10], further comprising, after the heat treatment, effecting aging treatment at a lower temperature.

[12] The method of any one of [1] to [11], wherein said powder is disposed on the magnet body surface as a slurry of particles having an average particle size of up to 100 μm dispersed in an aqueous or organic solvent.

[13] The method of any one of [1] to [12], further comprising cleaning the sintered magnet body with at least one of alkalis, acids and organic solvents, prior to the disposition of the powder thereon and the heat treatment.

[14] The method of any one of [1] to [12], further comprising shot blasting the sintered magnet body to remove a surface layer thereof, prior to the disposition of the powder thereon.

[15] The method of any one of [1] to [14], wherein cleaning with at least one of alkalis, acids and organic solvents, grinding, plating, or coating is carried out as a final treatment following the heat treatment.

[16] A rare earth permanent magnet prepared by the method of any one of [1] to [15].

[17] A permanent magnet rotary machine having incorporated therein a rare earth permanent magnet prepared by the method of any one of [1] to [15] wherein the slits in the magnet are perpendicular to a magnetic anisotropy direction.

[18] The permanent magnet rotary machine of [17] wherein the slits in the surface of the rare earth permanent magnet are filled with an electrically non-conductive material.

BENEFITS OF THE INVENTION

The R—Fe—B sintered magnet of the invention has minimized eddy current, a high remanence, and a high coercive force suited for permanent magnet rotary machines. A permanent magnet rotary machine using the magnet is advantageous.

DESCRIPTION OF THE PREFERRED EMBODIMENTS

Figure 1A:
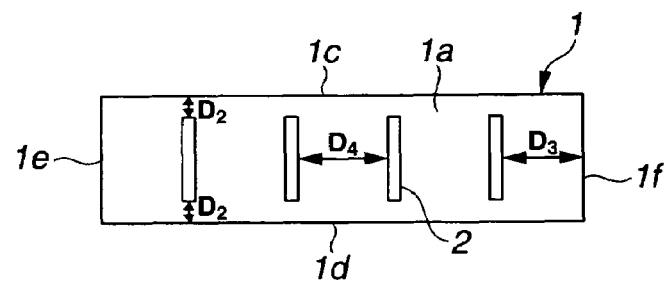
FIG. 1 illustrates formation of slits in a sintered magnet body, FIGS. 1A to 1C being plan views of different slit patterns, FIG. 1D being a cross-sectional view, FIG. 1E illustrating regions of distance L where the magnet body is effectively infiltrated with $R^2$ oxide, $R^3$ fluoride or $R^4$ oxyfluoride through heat treatment, and FIG. 1F illustrating absorption treatment of a slit-less magnet body.

The invention pertains to a R—Fe—B sintered magnet having minimized eddy current, a high remanence and a high coercive force suited for permanent magnet rotary machines, and a permanent magnet rotary machine using the magnet. The rare earth permanent magnet of the invention is prepared in one embodiment by forming slits in a surface of a sintered magnet body of $R^1$—Fe—B composition, feeding an oxide, fluoride or oxyfluoride of a rare earth element (to be described later) to the magnet body and heat treating or in another embodiment by feeding an oxide, fluoride or oxyfluoride of a rare earth element (to be described later) to a surface of a sintered magnet body of $R^1$—Fe—B composition, heat treating, and forming slits in the magnet body.

The $R^1$—Fe—B sintered magnet body may be obtained from a mother alloy in a conventional way by coarse pulverization, fine pulverization, compacting and sintering.

As used herein, R and $R^1$ each are selected from among rare earth elements inclusive of yttrium (Y) and scandium (Sc). R is mainly used for the magnet obtained, and $R^1$ is mainly used for the starting material.

The mother alloy contains $R^1$, iron (Fe), and boron (B). $R^1$ represents one or more elements selected from among rare earth elements inclusive of Y and Sc, examples of which include Y, Sc, La, Ce, Pr, Nd, Sm, Eu, Gd, Tb, Dy, Ho, Er, Yb, and Lu. Preferably $R^1$ is mainly composed of Nd, Pr, and Dy. The rare earth elements inclusive of Y and Sc should preferably account for 10 to 15 atom %, especially 12 to 15 atom % of the entire alloy. More preferably, $R^1$ should contain either one or both of Nd and Pr in an amount of at least 10 atom %, especially at least 50 atom %. Boron (B) should preferably account for 3 to 15 atom %, especially 4 to 8 atom % of the entire alloy. The alloy may further contain 0 to 11 atom %, especially 0.1 to 5 atom % of one or more elements selected from among Al, Cu, Zn, In, Si, P, S, Ti, V, Cr, Mn, Ni, Ga, Ge, Zr, Nb, Mo, Pd, Ag, Cd, Sn, Sb, Hf, Ta, and W. The balance consists of Fe and incidental impurities such as C, N and O. Iron (Fe) should preferably account for at least 50 atom %, especially at least 65 atom % of the entire alloy. It is acceptable that Co substitutes for part of Fe, for example, 0 to 40 atom %, especially 0 to 15 atom % of Fe.

The mother alloy is obtained by melting the starting metals or alloys in vacuum or in an inert gas, preferably Ar atmosphere, and then casting in a flat mold or book mold, or casting as by strip casting. An alternative method, called two-alloy method, is also applicable wherein an alloy whose composition is approximate to the $R_2Fe_{14}B$ compound, the primary phase of the present alloy and an R-rich alloy serving as a liquid phase aid at the sintering temperature are separately prepared, crushed, weighed and admixed together. The primary phase alloy whose composition is approximate to the $R_2Fe_{14}B$ compound may be obtained by strip casting. It is noted that since the alloy whose composition is approximate to the primary phase composition is likely to leave α-Fe phase depending on the cooling rate during the casting or the alloy composition, it is subjected to homogenizing treatment, if desired for the purpose of increasing the amount of $R_2Fe_{14}B$ compound phase. The homogenization is achievable by heat treatment in vacuum or in an Ar atmosphere at 700 to 1,200° C. for at least 1 hour. For the R-rich alloy serving as a liquid phase aid, not only the casting technique described above, but also the so-called melt quenching and strip casting techniques are applicable.

Furthermore, in the pulverizing step to be described below, at least one compound selected from a carbide, nitride, oxide and hydroxide of $R^1$ or a mixture or composite thereof can be admixed with the alloy powder in an amount of 0.005 to 5% by weight.

The alloy is generally coarsely pulverized to a size of 0.05 to 3 mm, especially 0.05 to 1.5 mm. For the coarse pulverizing step, a Brown mill or hydriding pulverization is used, with the hydriding pulverization being preferred for the alloy prepared by strip casting. The coarse powder is then finely pulverized to a size of 0.2 to 30 μm, especially 0.5 to 20 μm, for example, on a jet mill using high pressure nitrogen. The fine powder is compacted in a magnetic field by a compression molding machine and introduced into a sintering furnace. The sintering is carried out in vacuum or an inert gas atmosphere, typically at 900 to 1,250° C., especially 1,000 to 1,100° C.

The sintered magnet thus obtained contains 60 to 99% by volume, preferably 80 to 98% by volume of the tetragonal $R_2Fe_{14}B$ compound as the primary phase, with the balance being 0.5 to 20% by volume of an R-rich phase, 0 to 10% by volume of a B-rich phase, and at least one of carbides, nitrides, oxides and hydroxides resulting from incidental impurities or additives or a mixture or composite thereof.

The sintered block is then machined into a preselected shape. In one embodiment of the invention, at the same time as the machining step, a plurality of slits are formed in a surface of the magnet body to increase the specific surface area thereof for facilitating absorption of $R^2$, $R^3$ or $R^4$ into the magnet body from a powder comprising one or more compounds selected from an oxide of $R^2$, a fluoride of $R^3$, and an oxyfluoride of $R^4$ disposed on the magnet body surface.

Figure 1B:
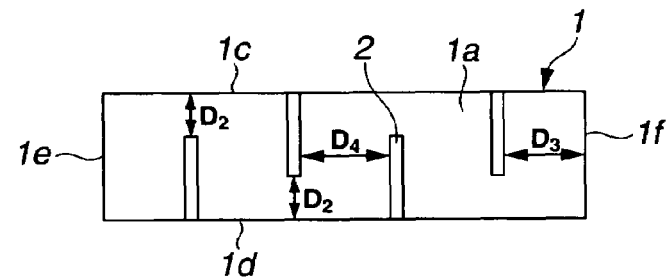
Figure 1C:
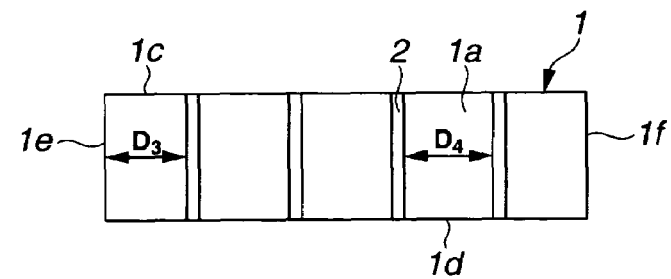
Figure 1D:
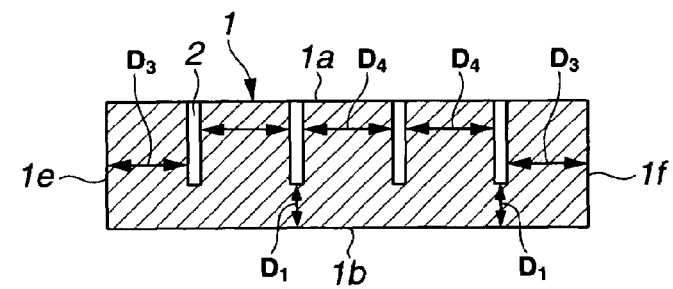

The pattern of slit formation is not particularly limited and an appropriate one may be selected from various patterns depending on formation of a sintered magnet body. Reference is made to an example where the sintered magnet body is rectangular parallelepiped. As shown in FIG. 1, a sintered magnet body 1 has a front surface 1a where slits are to be formed, a back surface 1b remote from the front surface 1a, longitudinal side surfaces 1c and 1d, and widthwise side surfaces 1e and 1f. FIGS. 1A to 1C are plan views of magnet bodies where slits are formed in different patterns and FIG. 1D is a cross-sectional view. A plurality of slits 2 are formed in the front surface 1a such that the opposite ends of slits 2 are spaced apart from the longitudinal side edges of the front surface 1a as shown in FIG. 1A, or only one end of slits 2 is spaced apart from the longitudinal side edge of the front surface 1a as shown in FIG. 1B, or slits 2 extend throughout (from one to the other longitudinal side edge of) the front surface 1a as shown in FIG. 1C. In these embodiments, the slits 2 are parallel to the widthwise side surfaces 1e and 1f. Slit formation is not limited to these embodiments.

When slits 2 are formed in the slit-forming surface 1a of a sintered magnet body 1 as shown in FIGS. 1A to 1D, the length and depth of slits 2 are preferably as follows. the distance $D_1$ between the bottom of slits 2 and the back surface 1b is preferably up to 5 mm, more preferably up to 3 mm, even more preferably up to 1 mm; and the distance $D_2$ between the longitudinal end of slits 2 and the corresponding side surface 1c or 1d is preferably up to 5 mm, more preferably up to 3 mm, even more preferably up to 1 mm. The spacing $D_3$ between the widthwise side surface 1e or 1f and the adjacent slit 2 is preferably up to 10 mm, more preferably up to 6 mm, even more preferably up to 2 mm; and the spacing $D_4$ between adjoining slits 2 is preferably up to 10 mm, more preferably up to 6 mm, even more preferably up to 2 mm. Usually, the distance $D_1$ is preferably at least 0.4 mm. The distance $D_2$ may be 0 mm. The spacings $D_3$ and $D_4$ are each preferably at least 0.4 mm.

Figure 1E:
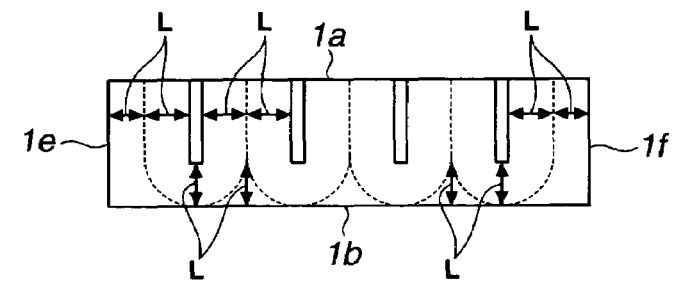

Once slits are formed in this way, the maximum distance L from the magnet surface and the slit wall to the magnet interior is up to 5 mm as shown in FIG. 1E, ensuring that the magnet in its entirety is uniformly and efficiently infiltrated with the $R^2$ oxide, $R^3$ fluoride or $R^4$ oxyfluoride during heat treatment. The distance L is preferably up to 3 mm, more preferably up to 1 mm.

Figure 1F:
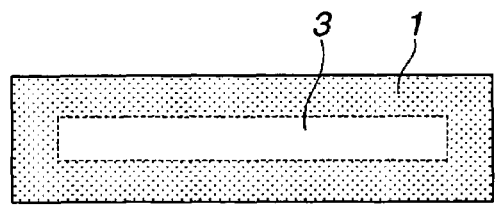

Now that the distance relation of slits to magnet body surfaces is set as mentioned above, the surface area of slits themselves adds to the surface area of the magnet body so that absorption process readily takes place in any region throughout the magnet body. If no slits are formed, little absorption process will take place in a central region 3 spaced at least 5 mm from the surfaces of the sintered magnet body 1 as shown in FIG. 1F. As mentioned above, the formation of slits increases the region where absorption process from the surface takes place.

It is understood that the slits can also be formed at the compact stage prior to sintering.

If the sintered block in the slit-less state has a dimension of up to 100 mm, especially up to 50 mm along its maximum side and a dimension of up to 10 mm, especially up to 5 mm in a magnetic anisotropy direction, the same advantages as in the first embodiment wherein slit formation is followed by heat treatment are obtainable in a second embodiment wherein slits are formed in the magnet surface after the heat treatment that causes $R^2$, $R^3$ or $R^4$ to be absorbed in the magnet body from the powder comprising one or more compounds selected from an oxide of $R^2$, a fluoride of $R^3$, and an oxyfluoride of $R^4$ disposed on the magnet surface. That is, the advantages of minimized eddy current, a high remanence and a high coercive force are also obtainable in the second embodiment. No particular lower limits need be imposed on the dimension along the maximum side and the dimension in the magnetic anisotropy direction. The shape may have a dimension of at least 1 mm along the maximum side and a dimension of at least 0.5 mm in the magnetic anisotropy direction. However, these dimensions are selected so as to meet the lower limits of the distances $D_1$, $D_2$ and spacings $D_3$, $D_4$, and the distance L.

Unlike the prior art eddy current reducing method involving dividing a magnet into segments, bonding them together, and consolidating into a magnet of a predetermined size (segmented magnet), the method of the invention simply requires to form slits in a segment magnet. The manufacturing cost is reduced because the bonding and assembling steps of segmented magnet are eliminated. The width of slits is preferably equal to or less than 1 mm in order to avoid any loss of magnetic flux. Since slits are formed in a non-sintered or sintered compact by machining on a cutting machine such as an inner or outer blade cutter, wire saw or water jet, the width of slits is desirably equal to or less than 0.8 mm when the thickness of a cutting edge is considered. No particular lower limit is imposed on the slit width although a width of at least 0.05 mm is practical due to the restrictions of the cutting machine.

Disposed on the surface of the machined magnet body is a powder comprising one or more compounds selected from an oxide of $R^2$, a fluoride of $R^3$, and an oxyfluoride of $R^4$. It is noted that each of $R^2$, $R^3$ and $R^4$ is one or more elements selected from among rare earth elements inclusive of Y and Sc and preferably contains at least 10 atom %, more preferably at least 20 atom %, most preferably at least 40 atom % of Dy or Tb. In a powder comprising the $R^3$ fluoride and/or the $R^4$ oxyfluoride, it is desired for the objects of the invention that $R^3$ and/or $R^4$ contain at least 10 atom % of Dy and/or Tb and that the total concentration of Nd and Pr in $R^3$ and/or $R^4$ be lower than the total concentration of Nd and Pr in $R^1$.

For the reason that a more amount of $R^2$, $R^3$ or $R^4$ is absorbed as the filling factor of the powder in the magnet surface-surrounding space is higher, the filling factor should preferably be at least 10% by volume, more preferably at least 40% by volume, calculated as an average value in the magnet surrounding space from the magnet surface to a distance of 1 mm, in order for the invention to attain its effects.

One exemplary technique of disposing or applying the powder is by dispersing a fine powder comprising one or more compounds selected from an oxide of $R^2$, a fluoride of $R^3$, and an oxyfluoride of $R^4$ in water or an organic solvent to form a slurry, immersing the magnet body in the slurry, and drying in hot air or in vacuum or drying in the ambient air. Alternatively, the powder can be applied by spray coating or the like. Any such technique is characterized by ease of application and mass treatment. The particle size of the fine powder affects the reactivity when the $R^2$, $R^3$ or $R^4$ component in the powder is absorbed in the magnet. Smaller particles offer a larger contact area that participates in the reaction. In order for the invention to attain its effects, the powder disposed on the magnet should desirably have an average particle size of up to 100 μm, preferably up to 10 μm. No particular lower limit is imposed on the particle size although a particle size of at least 1 nm is preferred. It is noted that the average particle size is determined as a weight average diameter $D_{50}$ (particle diameter at 50% by weight cumulative, or median diameter) upon measurement of particle size distribution by laser light diffractometry.

The oxide of $R^2$, fluoride of $R^3$, and oxyfluoride of $R^4$ used herein are typically $R^2{}_2O_3$, $R^3F_3$, and $R^4OF$, respectively, although they generally refer to oxides containing $R^2$ and oxygen, fluorides containing $R^3$ and fluorine, and oxyfluorides containing $R^4$, oxygen and fluorine, additionally including $R^2O_n$, $R^3F_n$, and $R^4O_mF_n$ wherein m and n are arbitrary positive numbers, and modified forms in which part of $R^2$, $R^3$ or $R^4$ is substituted or stabilized with another metal element as long as they can achieve the benefits of the invention.

The powder disposed on the magnet surface contains the oxide of $R^2$, fluoride of $R^3$, oxyfluoride of $R^4$ or a mixture thereof, and may additionally contain at least one compound selected from among a carbide, nitride hydroxide and hydride of $R^5$ or a mixture or composite thereof wherein $R^5$ is one or more elements selected from among rare earth elements inclusive of Y and Sc. When the $R^3$ fluoride and/or $R^4$ oxyfluoride is used, the powder may further contain an oxide of $R^5$. Further, the powder may contain a fine powder of boron, boron nitride, silicon, carbon or the like, or an organic compound such as stearic acid in order to promote the dispersion or chemical/physical adsorption of the powder. In order for the invention to attain its effect efficiently, the powder should contain at least 10% by weight, preferably at least 20% by weight (based on its entire weight) of the oxide of $R^2$, fluoride of $R^3$, oxyfluoride of $R^4$ or a mixture thereof. It is recommended that the oxide of $R^2$, fluoride of $R^3$ or oxyfluoride of $R^4$ as the main component account for at least 50% by weight, more preferably at least 70% by weight, and even more preferably at least 90% by weight based on the entire powder.

After the powder comprising the oxide of $R^2$, fluoride of $R^3$, oxyfluoride of $R^4$ or a mixture thereof is disposed on the magnet surface, the magnet and the powder are heat treated in vacuum or in an atmosphere of an inert gas such as argon (Ar) or helium (He). This treatment is referred to as absorption treatment, hereinafter. The temperature of absorption treatment is equal to or below the sintering temperature of the magnet body. The treatment temperature is limited for the following reason.

If treatment is done at a temperature above the sintering temperature (designated Ts in ° C.) of the relevant sintered magnet, there arise problems like (1) the sintered magnet alters its structure and fails to provide excellent magnetic properties; (2) the sintered magnet fails to maintain its dimensions as machined due to thermal deformation; and (3) the diffusing R can diffuse into the interior of magnet grains beyond the grain boundaries in the magnet, resulting in a reduced remanence. The treatment temperature should thus be equal to or below the sintering temperature, and preferably equal to or below (Ts-10)° C. The lower limit of temperature, which may be selected as appropriate, is typically at least 350° C. The time of absorption treatment is from 1 minute to 100 hours. The absorption treatment is not completed within less than 1 minutes whereas more than 100 hours of treatment gives rise to the problems that the sintered magnet alters its structure and the inevitable oxidation and evaporation of components adversely affect the magnetic properties. The more preferred time is 5 minutes to 8 hours, especially 10 minutes to 6 hours.

Through the absorption treatment described above, $R^2$, $R^3$ or $R^4$ which has been contained in the powder present on the magnet surface is transferred and concentrated in the rare earth-rich grain boundary phase component within the magnet where $R^2$, $R^3$ or $R^4$ substitutes near the surface layer of $R_2Fe_{14}B$ primary phase grains. In the event the powder contains the fluoride of $R^3$ or oxyfluoride of $R^4$, part of the fluorine contained in the powder is absorbed in the magnet along with the $R^3$ or $R^4$, substantially facilitating the supply of $R^3$ or $R^4$ from the powder and the diffusion of $R^3$ or $R^4$ at grain boundaries in the magnet.

The rare earth element contained in the oxide of $R^2$, fluoride of $R^3$, or oxyfluoride of $R^4$ is one or more elements selected from rare earth elements inclusive of Y and Sc. Since the elements which are most effective in enhancing magnetocrystalline anisotropy when concentrated at the surface layer are dysprosium and terbium, it is preferred that Dy and Tb be contained in the powder in a total amount of at least 10 atom % based on the rare earth elements, with a total amount of at least 20 atom % being more preferred. It is also preferred that the total concentration of Nd and Pr in $R^2$, $R^3$ and $R^4$ be lower than the total concentration of Nd and Pr in $R^1$.

As a result of the absorption treatment, the coercive force of the R—Fe—B sintered magnet is efficiently increased without entailing a substantial loss of remanence.

The absorption treatment may be carried out by placing the sintered magnet body in a slurry of the powder in water or organic solvent, allowing the powder to deposit on the surface of the sintered magnet body, and heat treating in this condition. In the absorption treatment, the magnets are covered with the powder so that the magnets are kept apart from each other, preventing the magnets from being fused together after the absorption treatment albeit high temperature. Additionally, the powder is not bonded to the magnets after the heat treatment. This permits a number of magnets to be placed in a container for treatment therein, indicating that the preparation method of the invention is also improved in productivity.

Also preferably, the absorption treatment is followed by aging treatment. The aging treatment is desirably at a temperature which is below the absorption treatment temperature, preferably from 200° C. to a temperature lower than the absorption treatment temperature by 10° C., and more preferably from 350° C. to a temperature lower than the absorption treatment temperature by 10° C. The atmosphere is preferably vacuum or an inert gas such as Ar or He. The time of aging treatment is from 1 minute to 10 hours, preferably from 10 minutes to 5 hours, and more preferably from 30 minutes to 2 hours.

It is noted for the machining of the sintered magnet body that if the coolant used in the machining tool is aqueous, or if the surface being machined is exposed to high temperature during the machining, there is a likelihood of an oxide film forming on the machined surface. This oxide film can inhibit the absorption reaction of $R^2$, $R^3$ or $R^4$ component from the powder to the magnet body. In such a case, the oxide film is removed by cleaning with at least one of alkalis, acids and organic solvents or by shot blasting before adequate absorption treatment is carried out.

Examples of the alkali used herein include potassium pyrophosphate, sodium pyrophosphate, potassium citrate, sodium citrate, potassium acetate, sodium acetate, potassium oxalate, sodium oxalate, etc. Examples of the acid used herein include hydrochloric acid, nitric acid, sulfuric acid, acetic acid, citric acid, tartaric acid, etc. Examples of the organic solvent used herein include acetone, methanol, ethanol, isopropyl alcohol, etc. Herein, the alkali or acid may be used as an aqueous solution having an appropriate concentration not to attack the magnet body.

Alternatively, the sintered magnet body may be subjected to shot blasting to remove a surface layer thereof before the powder is disposed thereon.

The magnet, which has been subjected to the absorption treatment and optionally, subsequent aging treatment, may be again cleaned with at least one of alkalis, acids and organic solvents or machined to a practical shape. Moreover, the process including absorption treatment, aging treatment, and cleaning or machining may further include subsequent plating or coating.

The slits which are formed according to the invention not only serve to facilitate absorption of $R^2$, $R^3$ or $R^4$ in the magnet body from the powder comprising the oxide of $R^2$, fluoride of $R^3$, or oxyfluoride of $R^4$ present on the magnet surface, but also when the magnet is incorporated in a permanent magnet rotary machine, serve to reduce the eddy current induced in the permanent magnet. One of the reasons why eddy currents are induced in magnets in a rotary machine is that the relative position of slots of an armature facing the magnets changes so that the magnetic flux within the magnet changes with time at the slot section. Eddy currents are also induced when the magnetic flux created by the armature is substantially distorted. The eddy current is a current flow induced on a conductor in a direction preventing the magnetic flux from changing. Since the magnetic flux of a magnet runs in the magnetic anisotropy direction and the eddy current flows in a plane perpendicular to the magnetic anisotropy direction, good results are obtained by forming slits in a surface perpendicular to the magnetic anisotropy direction for dividing the eddy current path. Better results are obtained by forming slits in a direction that narrows the eddy current path.

If the sintered block in the slit-less state has a dimension of up to 100 mm, especially up to 50 mm along its maximum side and a dimension of up to 10 mm, especially up to 5 mm in a magnetic anisotropy direction, $R^2$, $R^3$ or $R^4$ may be absorbed in the slit-less magnet body from the powder comprising an oxide of $R^2$, a fluoride of $R^3$, or an oxyfluoride of $R^4$ present on the magnet surface. In this embodiment, after the absorption treatment, a plurality of slits are formed in the magnet surface whereby the eddy currents induced in the permanent magnets incorporated in a permanent magnet rotary machine can be reduced.

The provision of slits reduces the mechanical strength of the segment magnet. Particularly when this magnet is used in a rotary machine, a substantial centrifugal force acts on the magnet during high-speed rotation, causing the magnet to be broken and scattered apart unless mechanical properties are sufficient. To overcome this problem, the slits are preferably filled with an electrically non-conductive material such as adhesive or resin to compensate for the loss of mechanical strength. The adhesives used herein should preferably have both heat resistance and bond strength and include epoxy and acrylic adhesives.

The permanent magnet materials thus obtained find use as R—Fe—B sintered magnets having a minimized eddy current, a high remanence and an increased coercive force suited for use in permanent magnet rotary machines. Permanent magnet rotary machines using the magnets are thus implemented.

EXAMPLE

Examples are given below for illustrating the present invention, but the scope of the invention is not limited thereby. In Examples, the filling factor of dysprosium oxide or dysprosium fluoride in the magnet surface-surrounding space is calculated from a weight gain of the magnet after powder treatment and the true density of powder material.

Examples 1, 2 and Comparative Examples 1, 2

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy had a composition of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy had a composition of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together for 30 minutes on a V blender which had been purged with nitrogen. On a jet mill using high-pressure nitrogen gas, the mixed powder was finely pulverized to a mass median particle diameter of 4 µm. The obtained fine powder was compacted in a nitrogen atmosphere under a pressure of about 1 ton/cm² while being oriented in a magnetic field of 15 kOe. The green compact was then placed in a sintering furnace in an argon atmosphere where it was sintered at 1,060° C. for 2 hours, obtaining a magnet block dimensioned 71 mm×46 mm×21 mm (thickness=magnetic anisotropy direction). Using a diamond cutter, the magnet block was machined on all the surfaces to 70 mm×45 mm×20 mm (magnetic anisotropy direction). At the same time, slits having a width of 0.5 mm and a depth of 15 mm were formed in the 70×45 mm surface (perpendicular to the magnetic anisotropy direction) and at a spacing of 4.5 mm in the direction of 70 mm side. The machined magnet body was cleaned with an alkaline solution, pickled and dried. Steps of rinsing with deionized water were included before and after each cleaning step.

Subsequently, dysprosium fluoride having an average particle size of 5 µm was mixed with ethanol at a weight fraction of 50%, in which the magnet body was immersed for one minute with ultrasonic waves being applied. The magnet body was pulled up and immediately dried with hot air. At this point, the filling factor of dysprosium fluoride in the magnet surface-surrounding space was 45%. The magnet body was subjected to absorption treatment in an argon atmosphere at 900° C. for one hour, then to aging treatment at 500° C. for one hour, and quenched, obtaining a magnet body designated M1.

For comparison purposes, a magnet body designated P1 was prepared by subjecting the slit-less magnet body to only heat treatment, and a magnet body designated P2 prepared by subjecting the slit magnet body to only heat treatment.

In Table 1, magnetic properties of magnet bodys M1, P1 and P2 are summarized. The inventive magnet M1 was found to offer an increase in coercive force of 400 kAm$^{-1}$ relative to the coercive force of the magnets P1 and P2 which had not been subjected to dysprosium absorption treatment. A drop of remanence was 5 mT. For comparison purposes, a magnet was prepared using an alloy composition in which part of Nd in Alloy A was substituted with Dy. This magnet was designed to achieve a coercive force increase of 400 kAm$^{-1}$, but its remanence dropped by 50 mT.

A backscattered electron image under SEM and compositional images by EPMA revealed the presence of Dy and F in magnet body M1. Since Dy and F are absent in the magnet body prior to the treatment, the presence of Dy and F in magnet body M1 is attributed to the absorption treatment according to the invention. Dysprosium absorbed is concentrated only in proximity to grain boundaries while fluorine (F) is also present at grain boundaries and bonds with oxides, which are contained as incidental impurities within the magnet before the treatment, to form oxyfluorides. This distribution of Dy enables to increase the coercive force while minimizing a drop of remanence.

Separately, terbium fluoride having an average particle size of 5 μm was mixed with ethanol at a weight fraction of 50%, in which a slit magnet body of the same shape as M1 and P2 was immersed for one minute with ultrasonic waves being applied. The magnet body was pulled up and immediately dried with hot air. At this point, the filling factor of terbium fluoride in the magnet surface-surrounding space was 45%. The magnet body was subjected to absorption treatment in an argon atmosphere at 900° C. for one hour, then to aging treatment at 500° C. for one hour, and quenched, obtaining a magnet body designated M2.

Magnetic properties of magnet body M2 are also shown in Table 1. The inventive magnet M2 was found to offer an increase in coercive force of 600 kAm$^{-1}$ relative to the coercive force of the magnets P1 and P2 which had not been subjected to terbium absorption treatment. A drop of remanence was 5 mT.

TABLE 1

| | Designation | Br (T) | HcJ (kAm$^{-1}$) | (BH)max (kJm$^{-3}$) |
|---|---|---|---|---|
| Example 1 | M1 | 1.415 | 1,400 | 390 |
| Example 2 | M2 | 1.415 | 1,600 | 390 |
| Comparative Example 1 | P1 | 1.420 | 1,000 | 395 |
| Comparative Example 2 | P2 | 1.420 | 1,000 | 395 |

Examples 1-1, 2-1 & Comparative Examples 1-1, 2-1

Figure 2:
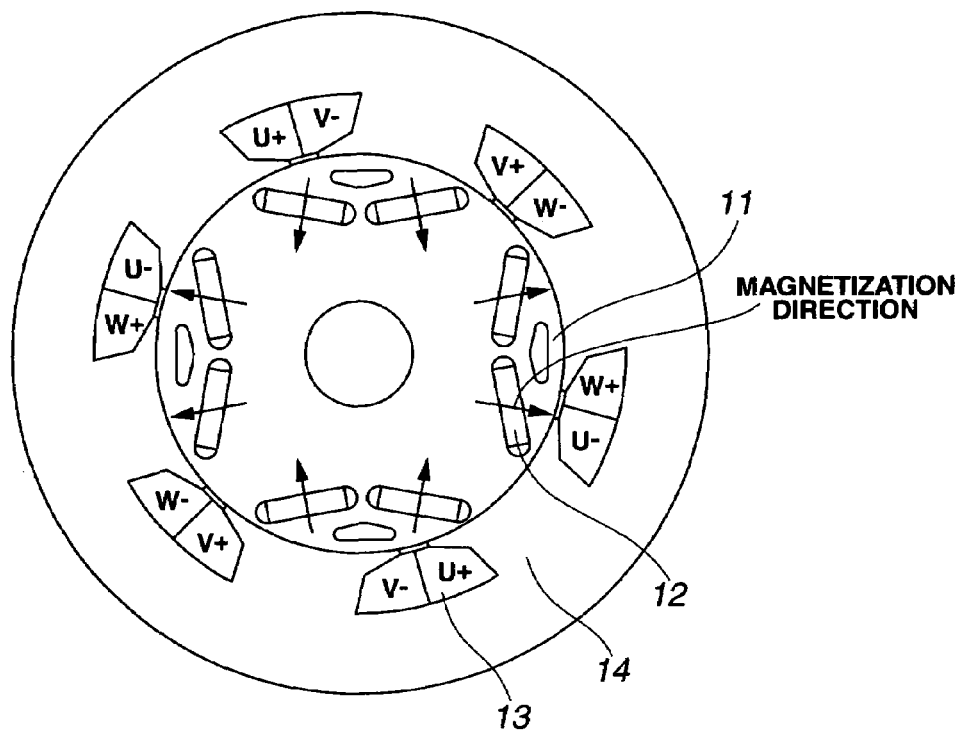
FIG. 2 is a schematic view of an interior magnet motor of 4 poles/6 slots.

Described below is the performance of permanent magnet motors having the magnets M1 and M2 of Examples and the magnets P1 and P2 of Comparative Examples incorporated therein. FIG. 2 illustrates an exemplary interior permanent magnet motor. A rotor has a four-pole structure of 0.5 mm magnetic steel sheet laminate having permanent magnets 12 embedded therein, and a rotor yoke 11 has an outer diameter of 312 mm and a height of 180 mm. The permanent magnets 12 each have a width of 70 mm, a dimension of 20 mm in the magnetic anisotropy direction, and an axial dimension of 180 mm. Since it is difficult to manufacture a sintered magnet having a length of 180 mm, in this example, four magnet parts having a length of 45 mm were bonded together with an epoxy adhesive. A stator has a six-slot structure of 0.5 mm magnetic steel sheet laminate with a concentrated winding coil wound with 60 turns on each teeth. The coil 13 is of a three-phase Y-connection of U, V and W phases. In FIG. 2, the symbols "+" and "−" attached to U, V and W indicate winding directions of coils, with "+" indicating a direction emerging from the plane of sheet and "−" indicating an entering direction. The stator yoke 14 has an outer diameter of 520 mm, an inner diameter of 315 mm, and a height of 180 mm. The gap between the rotor and stator is 1.5 mm. While the rotor and stator are positioned as shown in FIG. 2, an alternating current of cosine wave flows as the U phase, an alternating current having a 120° lead phase relative to the U phase flows as the V phase, and an alternating current having a 240° lead phase relative to the U phase flows as the W phase. Then the rotor rotates counter-clockwise by the interaction between the magnetic fluxes of permanent magnets and the magnetic fluxes of coils. The interior permanent magnet motor is characterized in that a greater torque is generated by controlling the phase of each phase current. When R—Fe—B sintered magnets having a high remanence are used, the motor produces a high output and a high efficiency and thus finds use in a wide variety of applications including household, industrial and automotive driving components. In the case of the motor shown in FIG. 2, a torque of 370 Nm was produced at a revolution of 2,400 rpm and a RMS current of 50 A for each phase, without phase control of current flow. The torque increased to 490 Nm when driven at a lead current phase of 40°. However, the magnetic flux of the coil opposed to the permanent magnet is increased by the lead current, so that the permanent magnet is in a demagnetizable situation. It must have a certain coercive force to overcome demagnetization. Also the magnetic flux passing through the permanent magnet perpetually changes with time as the rotor rotates, and eddy current is induced within the magnet by this change of magnetic field. Since the eddy current loss is in proportion to the square of a size, it is problematic to the magnet having a cross section of 70 mm×45 mm as used herein. If the magnetic flux of the coil opposed to the permanent magnet is increased by the lead current, the eddy current loss of the magnet is also increased. For these reasons, R—Fe—B sintered magnets having a minimized eddy current and a high coercive force are suited for permanent magnet rotary machines.

Figure 3:
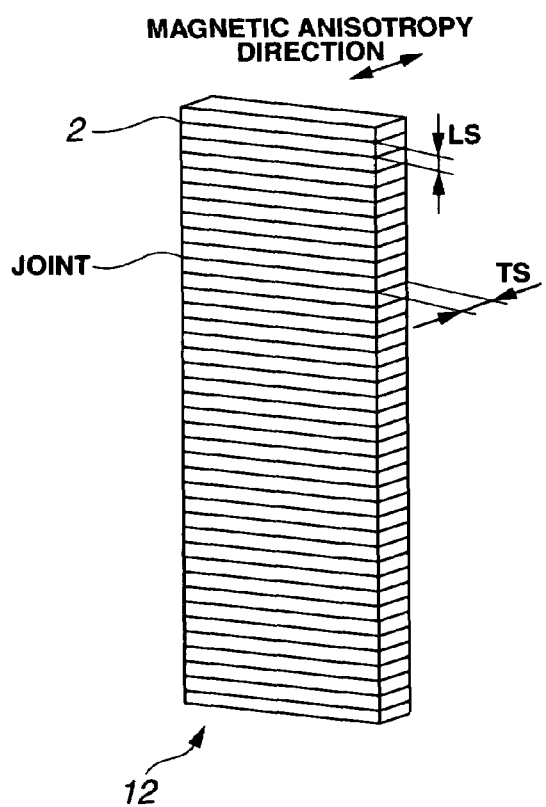
FIG. 3 is a perspective view of a plate-shaped permanent magnet obtained by joining of four slit pieces of magnet body M1, M2 or P2 and used in the motor of FIG. 2.
Figure 4:
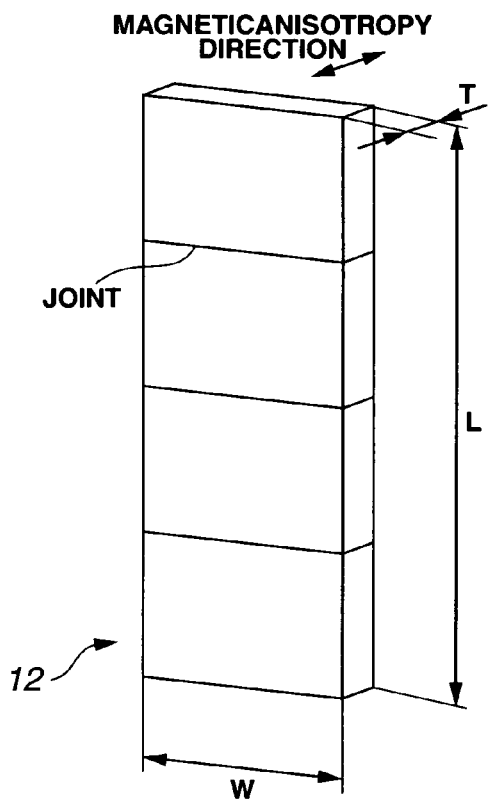
FIG. 4 is a perspective view of a plate-shaped permanent magnet obtained by joining of four slit-less pieces of comparative magnet body P1 and used in the motor of FIG. 2.

Four pieces of each magnet M1, M2, P1 or P2 were surface coated with an epoxy primer and butt joined with an epoxy adhesive in the 45 mm direction into an integral magnet. The slits in the magnets M1, M2 and P2 were filled with the epoxy adhesive. The integral magnets were magnetized and incorporated into a rotor as shown in FIG. 2. FIG. 3 shows the integral magnet resulting from joining of four slit pieces of each magnet M1, M2 or P2, and FIG. 4 shows the integral magnet resulting from joining of four slit-less pieces of magnet P1. The dimensions of FIGS. 3 and 4 include a width W=70 mm, a thickness T=20 mm, a length L=180 mm, a slit depth TS=15 mm, and a slit-to-slit spacing LS=4.5 mm. The motors having magnets M1, M2, P1 and P2 incorporated therein are designated MM1, MM2, MP1, and MP2, respectively. Each motor was continuously operated at an RMS current of 50 A in each phase, a current phase of 40°, and 2,400 rpm for one hour. From the ratio of the torque immediately after the continuous operation to the torque when operated again from the fully cooled state after the continuous operation, an amount of demagnetization in the permanent magnet was evaluated. The results are summarized in Table 2. In the motors MM1 and MM2 of Examples, no demagnetization occurred. In the motors MP1 and MP2 of Comparative Examples, the permanent magnets were demagnetized to low coercive forces. In the motor MP1, more substantial demagnetization occurred under the additional influence of heat generation by eddy currents.

TABLE 2

|  | Motor designation | Demagnetization (%) |
|---|---|---|
| Example 1-1 | MM1 | 0 |
| Example 2-1 | MM2 | 0 |
| Comparative Example 1-1 | MP1 | 41 |
| Comparative Example 2-1 | MP2 | 15 |

Examples 3, 4 and Comparative Examples 3, 4

Figure 5:
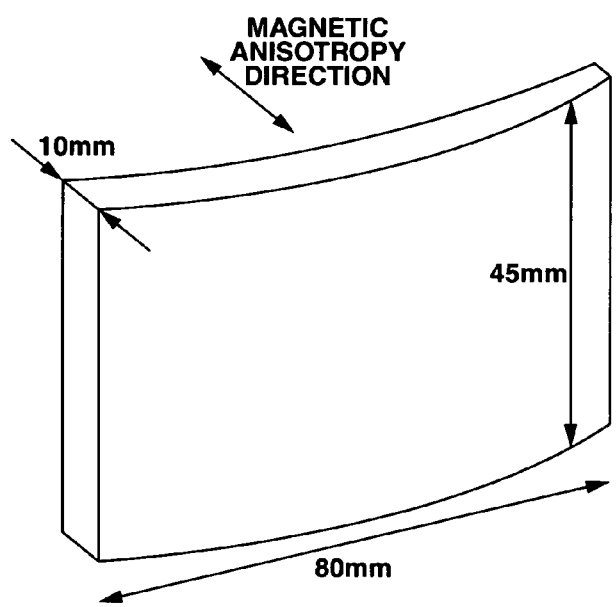
FIG. 5 is a perspective view of a magnet piece of magnet body.
Figure 6:
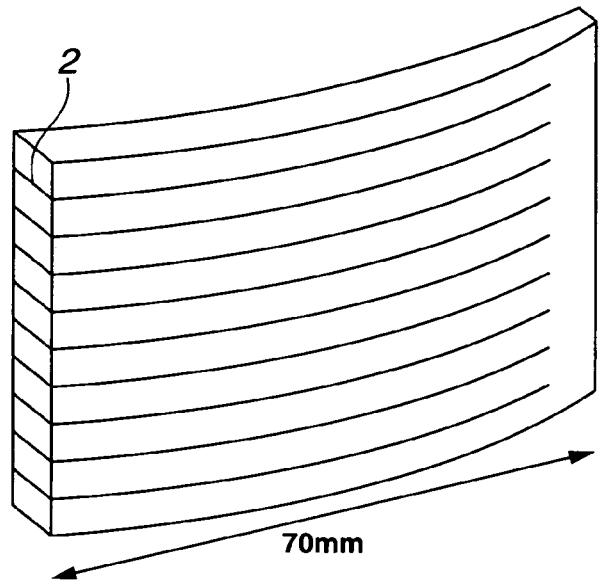
FIG. 6 is a perspective view of the magnet piece of FIG. 5 with slits.

By the same procedure as in Examples 1 and 2, a magnet body (which is a half of a C-shaped magnet) having a width of 80 mm, a height of 45 mm, and a maximum thickness in the magnetic anisotropy direction of 10 mm as shown in FIG. 5 was prepared. Parallel slits 2 having a width of 0.5 mm and a depth of 70 mm were cut at a spacing of 4.5 mm in the surface of the magnet body like a comb-shape as shown in FIG. 6.

Subsequently, dysprosium fluoride having an average particle size of 5 μm was mixed with ethanol at a weight fraction of 50%, in which the magnet body was immersed for one minute with ultrasonic waves being applied. The magnet body was pulled up and immediately dried with hot air. At this point, the filling factor of dysprosium fluoride in the magnet surface-surrounding space was 45%. The magnet body was subjected to absorption treatment in an argon atmosphere at 900° C. for one hour, then to aging treatment at 500° C. for one hour, and quenched, obtaining a magnet body designated M3. A magnet body designated M4 was obtained by using terbium fluoride in place of dysprosium fluoride and effecting similar heat treatment.

For comparison purposes, a magnet body designated P3 was prepared by subjecting the slit-less magnet body to only heat treatment, and a magnet body designated P3 prepared by subjecting the slit magnet body to only heat treatment.

Magnetic properties of magnet bodys M3, M4, P3 and P4 are shown in Table 3. The inventive magnet M3 having undergone dysprosium absorption treatment was found to offer an increase in coercive force of 450 kAm$^{-1}$ relative to the coercive force of the magnets P3 and P4 which had not been subjected to the absorption treatment. A drop of remanence was 5 mT. The inventive magnet M4 having undergone terbium absorption treatment showed a coercive force increase of 650 kAm$^{-1}$ and a remanence drop of 5 mT.

TABLE 3

|  | Designation | Br (T) | HcJ (kAm$^{-1}$) | (BH)max (kJm$^{-3}$) |
|---|---|---|---|---|
| Example 3 | M3 | 1.415 | 1,450 | 390 |
| Example 4 | M4 | 1.415 | 1,650 | 390 |
| Comparative Example 3 | P3 | 1.420 | 1,000 | 395 |
| Comparative Example 4 | P4 | 1.420 | 1,000 | 395 |

Examples 3-1, 4-1 & Comparative Examples 3-1, 4-1

Figure 7:
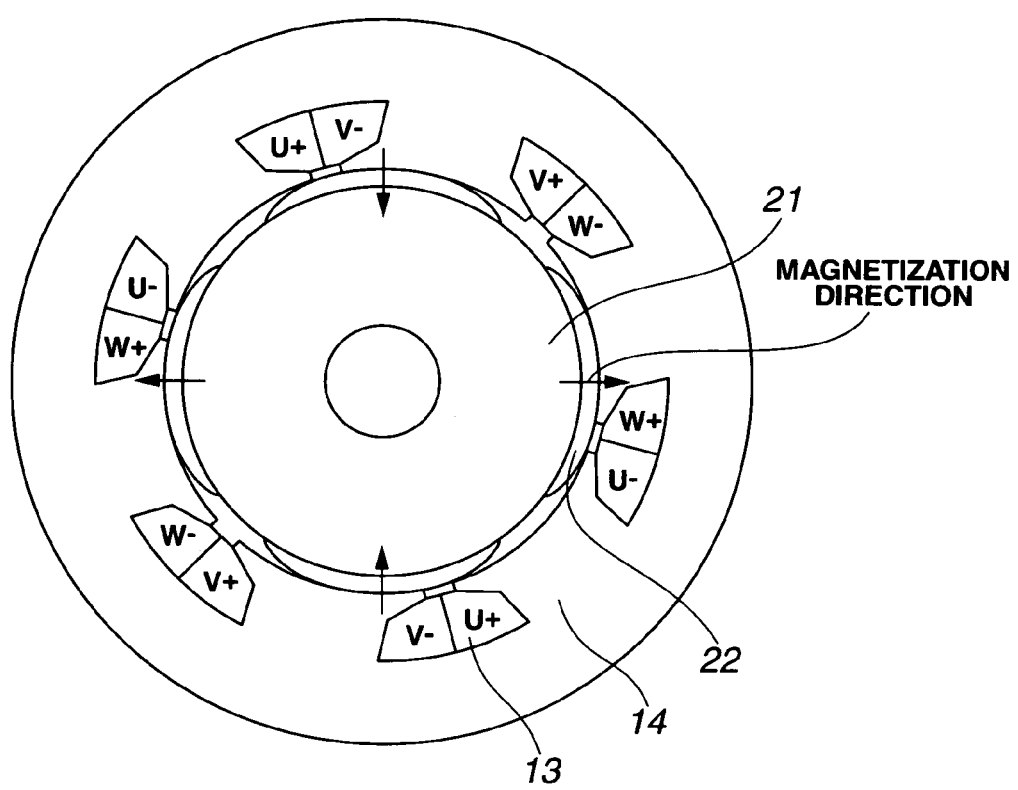
FIG. 7 is a schematic view of a surface magnet motor of 4 poles/6 slots.

Described below is the performance of permanent magnet motors having the magnets M3 and M4 of Examples and the magnets P3 and P4 of Comparative Examples incorporated therein. FIG. 7 illustrates an exemplary surface permanent magnet motor. A rotor has a four-pole structure and includes a rotor yoke 21 of 0.5 mm magnetic steel sheet laminate having C-shaped permanent magnets 22 disposed thereon. The rotor yoke 21 had an outer diameter of 312 mm and a height of 180 mm. The permanent magnets 22 each have a width of 160 mm, a dimension of 10 mm at the center and 3 mm at the edge in the magnetic anisotropy direction, and an axial dimension of 180 mm. Since it is difficult to manufacture a sintered magnet having a width of 160 mm or a length of 180 mm, in this example, total eight magnet segments including two in a row direction and four in a column direction were butt joined with an epoxy adhesive. A stator is the same as in Example 1-1, and so its description is omitted. A torque of 390 Nm was produced at a revolution of 2,400 rpm, a RMS current of 50 A, and a current phase of 0°. Since the surface permanent magnet motor produces a torque that undergoes a linear change with the input current and is excellent in controlling the torque and revolution, and thus finds use in a wide variety of applications including household, industrial and automotive motors where high precision control is required. However, in the surface permanent magnet motor, the diamagnetic field of the coil directly enters the permanent magnet, so that the permanent magnet is in a demagnetizable situation. It must have a certain coercive force to overcome demagnetization. Also since the magnetic flux within the permanent magnet sharply changes in the slot portion of the opposed stator as the rotor rotates, substantial eddy current is induced within the magnet. Since the eddy current loss is in proportion to the square of a size, it is problematic to the magnet having a cross section of 80 mm×45 mm as used herein. For these reasons, R—Fe—B sintered magnets having a minimized eddy current and a high coercive force are desired.

Figure 8:
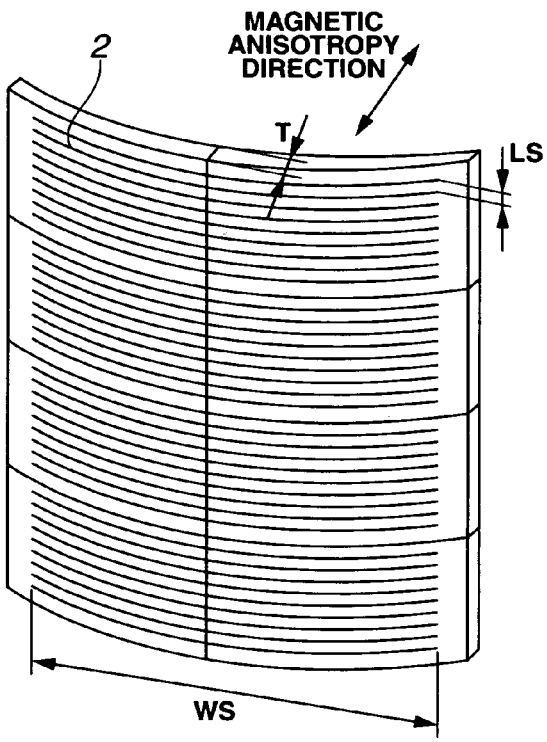
FIG. 8 is a perspective view of a C-shaped permanent magnet obtained by joining of eight slit pieces of magnet body M3, M4 or P4 and used in the motor of FIG. 7.
Figure 9:
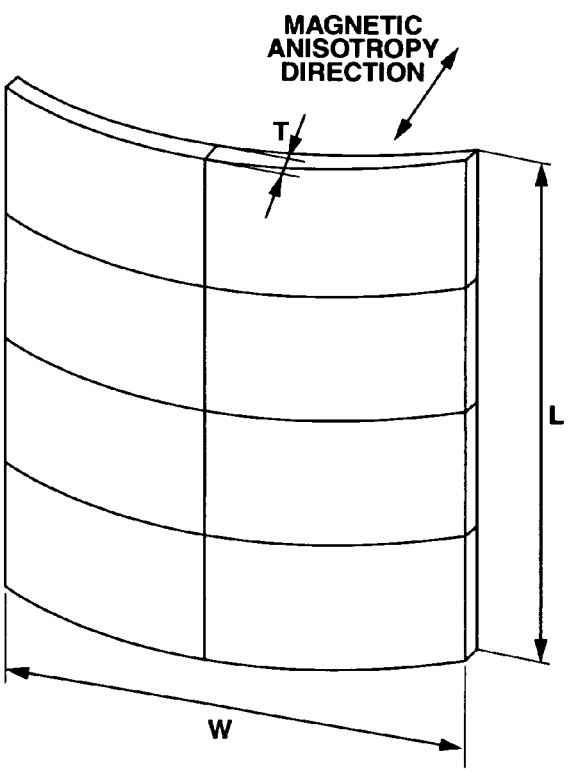
FIG. 9 is a perspective view of a C-shaped permanent magnet obtained by joining of eight slit-less pieces of comparative magnet body P3 and used in the motor of FIG. 7.

Eight pieces of each magnet M3, M4, P3 or P4 were surface coated with an epoxy primer and butt joined with an epoxy adhesive into a C-shaped magnet as shown in FIGS. 8 and 9. The slits in the magnets M3, M4 or P4 were filled with the epoxy adhesive. The magnets were magnetized and incorporated into a rotor as shown in FIG. 7. FIG. 8 shows the C-shaped magnet resulting from joining of eight slit pieces of each magnet M3, M4 or P4, and FIG. 9 shows the C-shaped magnet resulting from joining of eight slit-less pieces of magnet P3. In this example, since the magnet is as large as having a width of 160 mm, it is divided into two in the width direction. If the magnet has a width equal to or less than 100 mm, a C-shaped magnet provided with slits may be used without division in the width direction. The dimensions of FIGS. 8 and 9 include a width W=160 mm, a thickness T=10 mm, a length L=180 mm, a slit span WS=140 mm, and a slit-to-slit spacing LS=4.5 mm. The motors having magnets M3, M4, P3 and P4 incorporated therein are designated MM3, MM4, MP3, and MP4, respectively. Each motor was continuously operated at an RMS current of 50 A, a current phase of 0°, and 2,400 rpm for one hour. From the ratio of the torque immediately after the continuous operation to the torque when operated again from the fully cooled state after the continuous operation, an amount of demagnetization in the permanent magnet was evaluated. The results are summarized in Table 4. In the motors MP3 and MP4 of Comparative Examples, the permanent magnets had low coercive forces as a result of demagnetization. In the motor MP3, substantial demagnetization occurred under the additional influence of heat generation by eddy currents. In the motor MM3 of Example, a demagnetization of about 8% occurred. In order to avoid demagnetization in the motor of this structure, a magnet having a higher coercive force is necessary. Then in the motor MM4 having a higher coercive force than the motor MM3, no demagnetization occurred.

TABLE 4

| | Motor designation | Demagnetization (%) |
|---|---|---|
| Example 3-1 | MM3 | 8 |
| Example 4-1 | MM4 | 0 |
| Comparative Example 3-1 | MP3 | 50 |
| Comparative Example 4-1 | MP4 | 35 |

The examples refer to permanent magnet motors. Since permanent magnet power generators have the same structure, the same advantages are obtained from the generators using the inventive magnets.

Japanese Patent Application No. 2005-212265 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a rare earth permanent magnet from a sintered magnet body of a $R^1$—Fe—B composition wherein $R^1$ is at least one element selected from among rare earth elements inclusive of Y and Sc, the method comprising the steps of:

forming a plurality of slits in at least one surface of the magnet body, disposing a powder on the magnet body surface, the powder comprising at least one compound selected from among an oxide of $R^2$, a fluoride of $R^3$, and an oxyfluoride of $R^4$ wherein each of $R^2$, $R^3$, and $R^4$ is at least one element selected from among rare earth elements inclusive of Y and Sc, and heat treating the magnet body and the powder at a temperature equal to or below the sintering temperature of the magnet body in vacuum or in an inert gas, wherein the formation of the slits facilitates absorption of at least one of $R^2$, $R^3$ and $R^4$ in the magnet body from the powder comprising at least one of the oxide of $R^2$, fluoride of $R^3$, and oxyfluoride of $R^4$ present on the magnet surface, thereby increasing a coercive force.

2. The method of claim 1, wherein the plurality of slits formed in the surface of the magnet body are spaced at a spacing of up to 10 mm, and the distance between the bottom of each slit and the surface of the magnet body which is disposed remote from the slit surface is up to 5 mm.

3. The method of claim 1, wherein prior to the heat treatment, the sintered magnet body has a shape having a dimension of up to 100 mm at its maximum side and a dimension of up to 10 mm in a magnetic anisotropy direction.

4. The method of claim 1, wherein said powder is disposed on the magnet body surface in an amount corresponding to an avenge filling factor of at least 10% by volume in a magnet body-surrounding space within a distance of 1 mm from the magnet body surface.

5. The method of claim 1, wherein said powder has an average particle size of up to 100 μm.

6. The method of claim 1, wherein each of $R^2$, $R^3$, and $R^4$ contains at least 10 atom % of Dy and/or Tb.

7. The method of claim 1, wherein a powder comprising afluoride of $R^3$ and/or an oxyfluoride of $R^4$ is used whereby fluorine is absorbed in the magnet body along with $R^3$ and/or $R^4$.

8. The method of claim 7, wherein in the powder comprising a fluoride of $R^3$ and/or an oxyfluoride of $R^4$, $R^3$ and/or $R^4$ contains at least 10 atom % of Dy and/or Tb, and the total concentration of Nd and Pr in $R^3$ and/or $R^4$ is lower than the total concentration of Nd and Pr in $R^1$.

9. The method of claim 7, wherein in the powder comprising a fluoride of $R^3$ and/or an oxyfluoride of $R^4$, the $R^3$ fluoride and the $R^4$ oxyfluoride are contained in a total amount of at least 10% by weight, with the balance being at least one compound selected from among a carbide, nitride, oxide, hydroxide and hydride of $R^5$ wherein $R^5$ is at least one element selected from among rare earth elements inclusive of Y and Sc.

10. The method of claim 1, further comprising, after the heat treatment, effecting aging treatment at a lower temperature.

11. The method of claim 1, wherein said powder is disposed on the magnet body surface as a slurry of particles having an average particle size of up to 100 μm dispersed in an aqueous or organic solvent.

12. The method of claim 1, further comprising cleaning the sintered magnet body with at least one of alkalis, acids and organic solvents, prior to the disposition of the powder thereon.

13. The method of claim 1, further comprising shot blasting the sintered magnet body to remove a surface layer thereof, prior to the disposition of the powder thereon.

14. The method of claim 1, wherein cleaning with at least one of alkalis, acids and organic solvents, grinding, plating, or coating is carried out as a final treatment following the heat treatment.

15. A rare earth permanent magnet prepared by the method of claim 1.

16. A permanent magnet rotary machine having incorporated therein a rare earth permanent magnet prepared by the method of claim 1 wherein the slits in the magnet are perpendicular to a magnetic anisotropy direction.

17. The permanent magnet rotary machine of claim 16 wherein the slits in the surface of the rare earth permanent magnet are filled with an electrically non-conductive material.

* * * * *